Patented Apr. 25, 1944

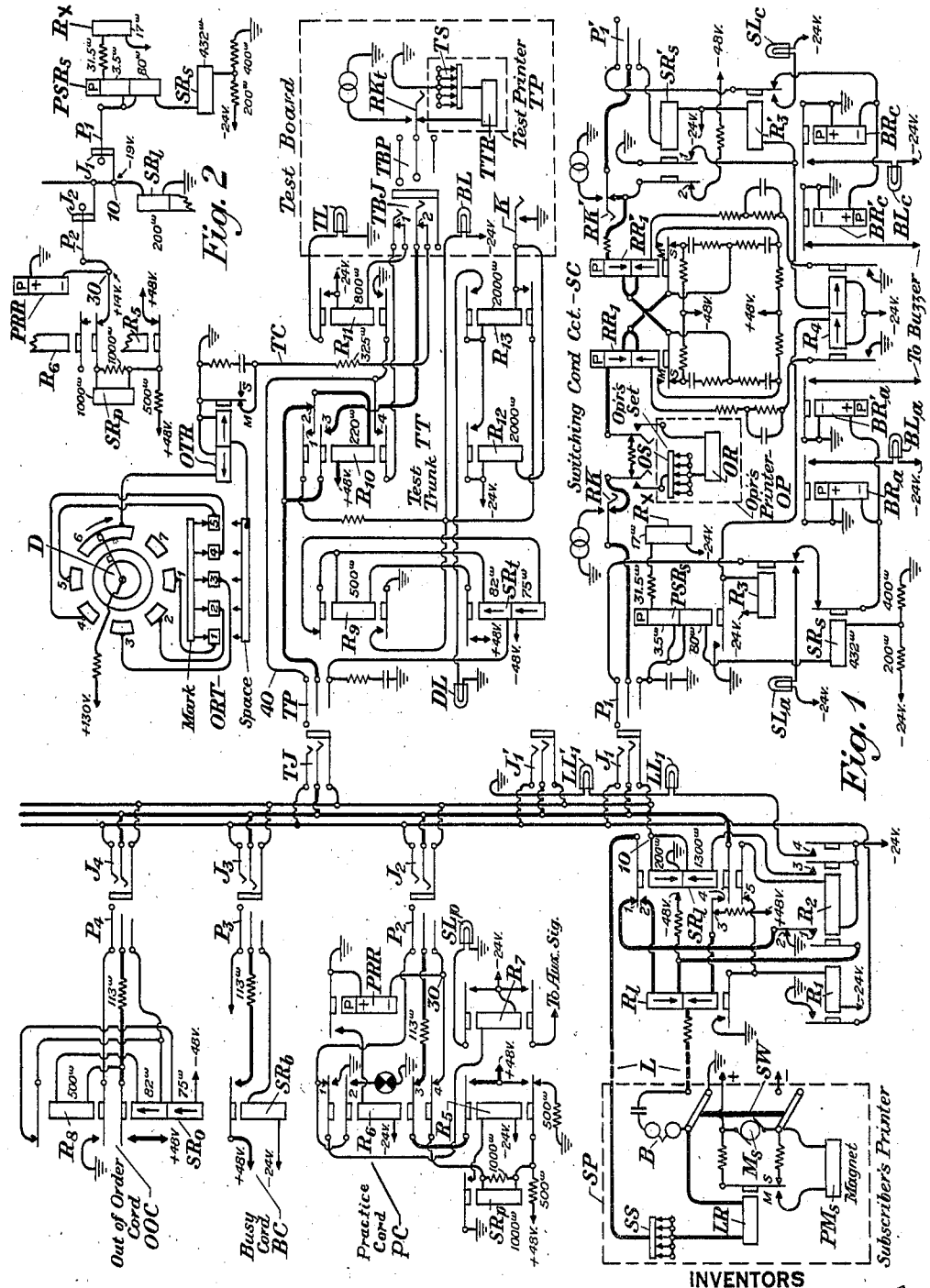

2,347,518

UNITED STATES PATENT OFFICE 2,347,518

TESTING ARRANGEMENT FOR TELEGRAPH CIRCUITS

James Spencer Soderholm, West Orange, N. J., and Charles Breen, Mineola, N. Y., assignors to American Telephone and Telegraph Company, a corporation of New York Application November 21, 1942, Serial No. 466,414

12 Claims. (Cl. 178—69)

This invention relates to testing arrangements for telegraph circuits and more particularly for telegraph circuits employing teletypewriter equipment for transmitting and receiving messages.

As is well known, teletypewriter circuits are now provided having teletypewriter equipment at the subscriber's premises and switchboard arrangements at a central office, so that any subscriber may be connected for this interchange of messages by a teletypewriter circuit extending from his own instrument to the teletypewriter equipment of another subscriber.

To test the teletype equipment of circuits of this type the maintenance man goes to the subscriber's premises and by means of the teletypewriter calls the operator at the central station and requests that a testing circuit be connected to the line. In accordance with the present invention the switching operator passes this information to a trouble operator, who then plugs into the line a special testing trunk leading to the test-board where a test-board attendant will be available to cooperate in making the tests. Plugging in the test trunk not only makes the line appear busy at all its multiples, but the test trunk is so arranged that the line will appear to be out of order to any operator who tests the line.

In the system herein disclosed, merely plugging in the test trunk does not automatically signal the test-board attendant and, indeed, the test trunk is not used immediately for any purpose. On the contrary, the maintenance man at the subscriber's station, after having ordered up the test trunk, proceeds without it to make preliminary and routine tests of the subscriber's teletype equipment. These tests include cleaning and adjusting electrical contacts, adjusting relays, oiling mechanical parts and making general mechanical tests to determine whether or not various elements of the printer mechanism are functioning properly.

Having made these preliminary tests the maintenance man is ready to make those tests which require the use of the test trunk. These tests are of two types. One type of test consists of orientation range measurements to determine whether or not the signal pulses received by the teletypewriter are of the proper wave shape. The other type of tests involves transmitting messages from the station equipment to a standard test printer at the test-board to determine whether the signals are coming through properly. In accordance with the practice heretofore used both of these types of tests require the cooperation of the test-board attendant, but in accordance with the present invention the attendant takes no part in the orientation range measurements.

The orientation range measurements take considerable time and where they require the assistance of the test-board man, as is the case under the former practice, it means that during these particular tests the test-board man is tied up and is not available for other services. It is therefore desirable to have some arrangement by which it will be unnecessary for the test-board man to take part in the orientation range measurements, especially as the results of the measurements themselves are actually observed by the maintenance man at the subscriber's station.

As is well known, the individual pulses of the Baudot code should theoretically be square-topped waves. Actually, of course, this condition does not exist. Even if properly shaped waves could be sent out by the transmitter, upon their arrival at the printer they would be considerably distorted by the transmission lines and the receiving equipment. It is therefore necessary for the maintenance man to determine to what extent the waves have become changed in shape during transmission. This he does by an orientation range measuring equipment which forms no part of the present invention and is not herein disclosed. This equipment is so arranged that it measures the amplitude of parts of successively transmitted wave pulses at relatively different times with respect to the period during which each individual pulse continues.

The effect of distortion is to round off the corners of the square-topped waves so that at the beginning of the wave and at the end thereof the current does not attain its full value. The orientation range measuring device is in effect shifted back and forth with respect to the time of the wave so that it tests brief time elements of the wave ranging from the beginning of the pulse through its middle portion to the end of the pulse. If these tests show that the wave is too much distorted, adjustments have to be made either to the printer or to the line equipment until proper waves are received.

When the maintenance man at the subscriber's station desired to make the orientation range measurements, under the previous practice he had to call the test-board attendant by telephone in order to have him apply to the trunk the test signals for the orientation range measurements. He was unable to communicate by telegraph to the switching operator at the central station because his line lamp was extinguished when the test trunk was plugged in. Moreover the test trunk had no signal lamp at the test-board which could be controlled from the subscriber's station.

To overcome these difficulties the testing circuit in accordance with the present invention is so arranged that when the test circuit is plugged in, for the purpose of connecting the line being tested to the test-board, the test-board attendant will not be called. In the meantime the maintenance man will proceed to make the routine tests as already described. The present invention provides circuit arrangements whereby when he has completed these tests, special signals for use during the orientation range measurements will be automatically applied to the trunk leading to the test-board. This enables the maintenance man to proceed with the orientation range measurements without calling the test-board man by telephone or otherwise.

The test trunk of the present invention is also arranged so that when the orientation range measurements are completed, the maintenance man at the subscriber's station can signal the test-board attendant over the test trunk. When the test-board attendant receives this signal he plugs into the trunk or test printer to receive signals sent from the subscriber's station, and by this test printer he determines whether proper signals are being sent out from the station. The arrangement of the trunk is such that the test-board attendant and the maintenance man are able to communicate with each other about the test signals, the former using the test printer and the associated sender at the test-board, and the latter employing teletypewriter equipment located at the subscriber's station.

This arrangement not only has the advantage of rendering it unnecessary for the maintenance man to call the test man by telephone, but it also eliminates any necessity for the test-board man taking any part in the orientation range measurements. Consequently he is free to attend to other duties while these measurements are being made.

The invention will now be more fully understood from the following detailed description when read in connection with the accompanying drawing. In the drawing Figure 1 is a circuit diagram showing the subscriber's station and various types of cord circuits and trunks at the central office for establishing connections or making tests; and Fig. 2 is a diagram showing a feature of the operation of the special cord which is plugged into the subscriber's line when the subscriber is using his instrument for practice.

APPARATUS

Subscriber's apparatus and line equipment

Referring to Fig. 1, the subscriber's printer SP is shown in the lower left-hand portion of the diagram. This includes a sender SS, conventionally represented, a line relay LR in circuit therewith, and a printing magnet $PM_s$ which by known means, not here illustrated, operates the receiving printer to type received messages. The subscriber's station also includes a bell B for ringing the subscriber and a switch SW for starting the motor $M_s$ and throwing the subscriber's circuit into operative condition. As is well known, the switching arrangements for starting up the motor and otherwise putting the subscriber's circuit into operating condition may be automatically controlled from the central office, but as these facilities form no part of the present invention, they are not herein illustrated. It will be understood however that they may be used with the present invention if desired.

The subscriber's equipment is connected by means of a line L to the central office where the line terminates in a jack $J_1$ and multiples thereof such as $J_1'$ through which connections may be established to other subscribers. Other multiple jacks may be provided, such as $J_2$ which enables a practice cord PC to be connected to the line; $J_3$ which enables a busy cord BC to be connected to the line; and $J_4$ which enables an out-of-order cord OOC to be plugged into the line for purposes which will be described later. It will be understood however that any of these special cords may be plugged into the regular answering jacks. At the trouble operator's position the line terminates in an additional jack TJ by which the test trunk TT, shown in the upper right-hand part of Fig. 1, may be plugged into the line for testing purposes as hereinafter described. In the lower right-hand portion of the diagram is shown a switching cord SC whereby a switching operator may make connections from the subscriber's line to other subscriber's lines by plugging into the jack $J_1$.

The line L has also associated therewith at the central office a differential sleeve relay $SR_1$ and a controlling relay $R_1$. The relay $R_1$ controls relays $R_1$ and $R_2$, the former of which under proper conditions operates the supervisory lamp $SL_a$ in the switching cord circuit SC, while the relay $R_2$ operates the line lamp $LL_1$ associated with the line jack $J_1$ and other line lamps such as $LL_1'$ when provided.

Switching cord circuit

The switching cord circuit SC is provided with an answering plug $P_1$ and a calling plug $P_1'$ which are used in establishing connections. It also includes a telegraph repeater comprising repeating relays $RR_1$ and $RR_1'$ with associated apparatus whereby telegraph code impulses may be relayed in either direction through the cord. In the sleeve of the cord associated with the answering plug is a polar sleeve relay $PSR_s$ and an additional sleeve relay $SR_s$. The former operates two relays $R_3$ and $R_4$, the first of which controls the circuit of the supervisory lamp $SL_a$, while the latter renders repeating relays $RR_1$ and $RR_1'$ operative. The relay $SR_s$ controls the busy circuit connected to the tip of the plug $P_1$. The busy circuit includes polar relays $BR_a$ and $BR_a'$ which operate respectively a busy lamp $BL_a$ and a buzzer, thus enabling the operator to distinguish between a line which is merely busy and one which is out of order, as will be described later.

The answering end of the cord circuit has associated therewith a sleeve relay $SR_s'$ controlling the relay $R_3'$ which in turn controls the busy circuit and the calling supervisory lamp $SL_c$. The busy circuit is connected to the tip of the plug $P_1'$ and includes polar relays $BR_c$ and $BR_c'$. These relays, like the corresponding relays associated with the answering end of the cord circuit, respectively control the busy lamp $BLX_c$ and a buzzer. In order that the operator may communicate with the calling subscriber an operator's set OP, including a sender OS and a printer relay or magnet OR, is provided. The printer relay or magnet OR functions to operate the receiving printer (not shown) in a manner well known in the art.

Practice cord circuit

In order that the subscriber may practice on his teletypewriter, a practice cord PC is provided. This cord has a sleeve relay $SR_p$ which controls an auxiliary relay $R_5$ to apply +48 volt battery to the ring conductor of the line, thus enabling the subscriber to operate his printer, as will be described later. Over the lower contact of relay $R_5$, +48 volt battery is also applied to the sleeve conductor of the practice cord to make the line test "out-of-order." Also associated with the sleeve conductor is a polar relay PRR. This relay is so poled that it is not operated by a current from the +48 battery applied to the ring conductor. It does respond, however, to the negative current which flows through it when a switching cord is plugged into the jack of the associated line, as will be described in more detail later. The polar relay PRR controls an auxiliary relay $R_6$ which under certain conditions connects an interrupted ground to the tip conductor, thus causing an interrupted or flashing operation of the supervisory lamp $SL_a$ of the cord circuit SC. Another relay $R_7$ is associated with the practice cord PC and causes the supervisory lamp $SL_p$ of the practice cord to operate when the subscriber disconnects, or when the switching operator by plugging into the line causes the polar relay PRR to operate.

Busy cord circuit

A busy cord BC is provided which may be plugged into a jack such as $J_3$ of the line to make the line appear busy to switching operators. This cord has a relay $SR_b$ in its sleeve circuit which applies +48 volt battery to the ring conductor of the line.

Out-of-order cord circuit

When the line is out of order for any reason whatever, the trouble operator, upon being notified of this condition, inserts the plug $P_4$ of an out-of-order OOC into the line jack $J_4$, which is located at the trouble operator's position. The cord OOC has a sleeve relay $SR_o$ associated with its sleeve conductor. The sleeve relay $SR_o$ applies +48 volt battery to both the ring and the sleeve and locks itself up through the auxiliary relay $R_3$. By applying +48 volt battery to the sleeve of the line, instead of the −24 volt battery that appears thereon when the line is normally busy, a switching operator touching the tip of her plug to the sleeve of the jack will get a buzzer signal instead of a busy lamp signal, which indicates that the line is out of order.

Test trunk

In order that a maintenance man may make orientation range measurements and signal tests a testing trunk trunk TT is provided, terminating in a plug TP at the trouble operator's position and terminating in a jack TBJ at the test-board position. This cord has in the sleeve circuit of its plug end a sleeve relay $SR_t$ similar to the sleeve relay $SR_o$ of the out-of-order cord. This relay locks up through an auxiliary relay $R_9$ and applies +48 volt battery to the tip conductor of the line when the test trunk is connected with the line. This gives an out-of-order signal similar to that produced by the out-of-order cord OOC.

An auxiliary relay $R_{10}$ is associated with the ring conductor of the trunk TT, and operates in response to a proper signal sent by the maintenance man at the subscriber's station, to connect the testing circuit TC to the ring conductor of the trunk for the purpose of making orientation range measurements. It also serves to connect another auxiliary relay $R_{11}$ to the tip conductor so that by a suitable signal the maintenance man can operate this relay and cause the test lamp TL to glow. The glowing of the test lamp TL indicates to the test-board man that his assistance is wanted to make signal tests. A test printer set TP, including a standard test sender TS and a test receiving relay TRR and associated equipment, is provided. The test-board attendant may plug this equipment into the jack TBJ to make signal tests as will be described later.

A busy lamp BL is operated by the relay $R_9$ when the test trunk TT is plugged into the line, to indicate to the trouble operator that the trunk is busy. This, however, does not call for any action on the part of the test-board attendant, and he does not respond until the test lamp TL is operated. A key K is provided in connection with the test trunk TT so that when the signal tests are completed, the test-board attendant may, by operating this key, actuate a relay $R_{12}$ which in turn operates a relay $R_{13}$, causing a disconnect lamp DL to glow at the trouble operator's position. This disconnect lamp indicates to the trouble operator that the trunk connection is to be taken down, and when taken down the apparatus of the trunk is restored to normal condition.

In order to make the orientation range measurements, the test circuit TC of the trunk has associated therewith a special transmitting device, which includes a distributor D similar to that used with the ordinary teletypewriter, and an orientation range transmitter ORT. This transmitter has five contacts which may be shifted individually to either marking or spacing positions to send any standard test group of code combinations. These transmitter contacts may be operated, either by an endless tape carrying a desired test sentence such as "The quick brown fox jumps over the lazy dog's back," or a set of cams may be provided to send the same set of code combinations. These code combinations operate through a transmission relay OTR to transmit the test sentence to the test circuit TC, and thence over the trunk to the printer of the line being tested, as will be described later.

OPERATION

Call from subscriber's station

If the subscriber, at whose station the apparatus SP is provided, wishes to make a call to another subscriber he will throw the switch SW to its upper position. The lower blade of the switch applies power to the printing motor $M_s$ and to the magnet $PM_s$ thus putting the printer in operating condition. The upper blade of the switch completes a circuit from +48 volt battery at the central office terminal of the line L, over normal contact 3 of sleeve relay $SR_1$, through the lower winding of the line relay $R_1$, over the lower conductor of line L, upper blade of switch SW, through the relay LR, through contacts of the sender SS, over the upper conductor of the line L, contact 1 of sleeve relay $SR_2$ and over contact 2 of relay $R_2$ to ground. This energizes relay $R_1$ which at its front contact closes a circuit for the relay $R_1$ and a circuit over the back contact 5 of relay $SR_1$ for relay $R_2$. Relay $R_1$ upon being energized applies ground to the tip conductor of the line multiple and thus applies ground to the tip conductor of jack J₁. The purpose of this ground is to control the supervisory lamp SL in the cord circuit as will be described later. At present the ground has no effect at all.

The relay R₂ upon being energized opens its back contact 2, disconnecting the ground from the circuit previously traced through the lower winding of the relay R₁. At its front contact 1, said relay R₂ establishes a new circuit for the lower winding of the relay R₁ as follows: From +48 volt battery over the contact 3 of sleeve SR₁, through the lower winding of relay R₁, over the lower conductor of the line L, through the substation apparatus as before, then over the upper conductor of the line L, back contact 1 of relay SR₁, front contact 1 of relay R₂ to −48 volt battery. This holds up the relay R₁ until the operator answers. The energization of relay R₂ at its contact 3 establishes a circuit from −24 volt battery over said contact 3, through the lower winding of the relay SR₁, and through the upper winding of said relay to ground. As these two windings oppose each other, however, SR₁ is not operated at this time. Relay R₂ at its contact 4 also completes a circuit from −24 volt battery, over said contact 4, through the line lamp LL₁, and through other lamps of multiple positions to ground.

Switching operator answers

Assuming that the operator at whose board the line lamp LL₁ appears answers the call, the operator will insert the plug P₁ of the switching cord SC into the jack J₁. Over the sleeve contacts of the plug P₁ and the jack J₁ the following circuit is now established: From −24 volt battery, through the 200-ohm resistance in the cord circuit, through the winding of relay SR$_s$, through the lower winding of the relay PSR$_s$ in the cord circuit, over the ring conductor of the plug and jack, and through the upper winding of the relay SR₁ to ground. Another circuit is established from −24 volt battery, through the 17-ohm winding of the relay R₄ in the cord circuit, through the 31.5 ohm resistance, through the 3.5 ohm winding of the relay PSR$_s$, over the ring conductors of the plug and jack, through the upper winding of relay SR₁ to ground.

The upper winding of the relay SR₁ now receives current from the −24 volt battery over three separate paths—one over the contact 3 of the relay R₂ associated with line L to point 10, a second through the relay SR$_s$ and the lower winding of relay PSR$_s$ in the cord circuit to point 10, and a third through the winding of the relay R$_x$ and the upper winding of relay PSR$_s$ in the cord circuit to point 10. The first of these paths includes a resistance of 1300 ohms through the lower winding of the relay SR₁. The second path through the winding of relay SR$_s$ includes a resistance of 712 ohms, made up of the 200-ohm resistance between the −24 volt battery and the relay SR$_s$, the 432-ohm resistance of said relay winding, and the 80-ohm resistance of the lower winding of the relay PSR$_s$. The third path has a resistance of 52 ohms between the −24 volt battery and the point 10, this resistance being made up of the 17-ohm resistance of the winding of the relay R₄, the 31.5 ohm resistance in circuit with the upper winding of the relay PSR$_s$, and the 3.5 ohm resistance of said upper winding. The resistance of this third path is so low compared with the other two that the current flow through the upper winding of the relay SR₁ is greatly increased and is much greater than the current through the lower winding, thus causing said relay SR₁ to be operated.

We now have the relays SR$_s$ and PSR$_s$ in the cord circuit energized and the sleeve relay SR₁ of the line operated. The relay SR$_s$ opens the busy circuit to the tip conductor of the plug P₁. This circuit, however, does not come into play at the present time. The relay PSR$_s$ actuates the relay R₃ and also completes a path through the right-hand winding of the relay R₄. Relay R₃ upon being operated, at its back contact opens the busy circuit at another point, and at its front contact connects the supervisory lamp SL$_a$ to the tip conductor of the plug P₁. Lamp SL$_a$ is not operated, however, due to the release of relay R₁ as will be described later.

Cord circuit repeater operation

Relay R₄ is energized through its right-hand winding and connects ground to the lower windings of the repeater relays RR₁ and RR₁' in the cord circuit. Current now flows from −48 volt battery, over the spacing contact of the relay RR₁ and through the lower winding of the relay RR₁' to ground over the right-hand front contact of relay R₄. This current is in such a direction as to shift the armature of the relay RR₁' to its marking contact. Current from the +48 volt battery now flows over the marking contact of relay RR₁' and over the left-hand front contact of relay R₄ to ground. The current through this circuit is in such direction as to tend to hold the armature of the relay RR₁ upon its spacing contact until a circuit is completed through the upper winding of the relay RR₁ as will be described later.

The sleeve relay SR₁ upon being operated, at its contact 5 opens the circuit for the relay R₂, thus extinguishing the line lamp LL₁ and line lamps of other multiples. The relay R₂ at its contact 3 also opens the connection through the lower winding of the relay SR₁ but the latter relay remains energized through its upper winding. At its front contacts 2 and 4 relay SR₁ completes a transmission path as follows: from −48 volt battery through the upper winding of the relay R₁ in the subscriber's line, over contact 2 of relay SR₁, over the upper conductor of the line L, through the subscriber's station, back over the lower conductor of the line L, through the lower winding of the relay R₁, over contact 4 of relay SR₁, over the ring conductors of the jack J₁ and the plug P₁, over the heavy lined ring conductor of the cord circuit to the upper winding of the repeater relay RR₁, thence through said winding and over the marking contact of the repeater relay RR₁' to +48 volt battery. Current thus flows through both windings of relay R₁ which is differential and releases, opening the circuit of relay R₁. Relay R₁ in turn opens the circuit of the supervisory lamp SL$_a$ to prevent it from lighting.

It will be noted that the positive battery connected over the marking contact of relay RR₁' is series aiding with respect to the negative battery connected to the upper winding of the relay R₁ in the line. A circuit previously traced also extends from the +48 volt battery over the marking contact of the relay RR'₁ through the lower winding of the relay RR₁ and over the front-left-hand contact of relay R₄ to ground. Only half as much current flows in this latter circuit as flows through the upper winding of the relay RR₁, due to the fact that the two batteries are series aiding in the circuit through the upper winding. Since the two windings of the relay $RR_1$ oppose each other when the currents flow as above described, the upper winding prevails and shifts the armature of the relay to its marking contact where it remains as long as the circuit conditions above described exist.

The shift of the armature of relay $RR_1$ reverses the direction of current flow through the lower winding of relay $RR_1'$ because +48 volt battery is now connected over the marking contact of relay $RR_1$ to the lower winding of the relay $RR_1'$. The current through the lower winding of relay $RR_1'$ is now in such a direction as to tend to shift the armature of the relay $RR_1'$ to its spacing contact. This action is prevented by current flowing through the upper winding of said relay from +48 volt battery, over marking contact of relay $RR_1$, through upper winding of relay $RR_1'$, over back contact number 2 of relay $SR_s'$ to —48 volt battery. This current being twice as great as that through the lower winding, and the upper winding being oppositely poled, the armature of relay $RR_1'$ remains on its marking contact.

It will be noted that even if the armature of the relay $RR_1'$ should be shifted to its spacing contact, under conditions which will be described later, the armature of the relay $RR_1$ will not shift. When the armature of relay $RR_1'$ is on its spacing contact the —48 volt battery now connected to the upper winding of the relay $RR_1$ over the contact of the relay $RR_1'$ opposes the potential of the negative battery applied to said upper winding of relay $RR_1$ through the winding of the relay $R_1$. Current therefore ceases to flow through said upper winding. However, the direction of current through the lower winding of the relay $RR_1$ is reversed by the shifting of the armature of relay $RR_1'$ and is now in such a direction as to hold the armature of relay $RR_1$ on its marking contact.

*Operator communicates with calling subscriber*

The operator is now able to communicate with the subscriber at the calling station and can use her sender OS to ask the subscriber what connection is desired. The operation of the sender in sending the code combinations will cause open circuit conditions of the circuit through the upper winding of the relay $RR_1$ for each spacing impulse. During each spacing impulse the armature of the relay $RR_1$ will therefore be shifted to its spacing contact. This produces a no current condition in the upper winding of relay $RR_1'$, but it also reverses the current through the lower winding of the relay $RR_1'$ and causes said lower winding to hold the armature of said relay upon its marking contact. No current impulses through the upper winding of relay $RR_1'$ are without effect, however, because plug $P_1'$ is not connected to an outgoing line and hence the signals are in effect not repeated. As soon as the armature of the relay $RR_1$ is shifted back to marking, the current through the lower winding of the relay $RR_1'$ is again reversed but the current through its upper winding prevails and holds its armature on its marking contact as before.

Each time the line circuit is opened as above described the circuit through the two opposing windings of the relay $R_1$ is opened but this is without effect. The two windings oppose each other during the marking condition and receive no current during the spacing condition so that the relay is not actuated under either condition. The relay LR at the subscriber's station, however, responds to the marking and spacing signals to operate the subscriber's printer.

The subscriber now uses his sender SS to send to the central operator's printer the number of the desired line. This, of course, will cause interruptions of the line during spacing impulses with the same results upon the repeater relays $RR_1$ and $RR_1'$ as already described. When the central office operator receives the transmitted number she inserts the plug $P_1'$ into the jack of the wanted line which will be in all respects similar to the line illustrated at the left in Fig. 1. In order to understand the operations taking place upon the called line let us assume that the line L is the called line and that the apparatus associated therewith is in its normal condition when the plug $P_1'$ is inserted in the jack $J_1$.

*Extending connection to called subscriber*

The operator now inserts the plug $P_1'$ into the jack of the called line corresponding to jack $J_1$. Before plugging into the jack the operator tests the line by touching the tip of the plug $P_1'$ against the sleeve of the jack corresponding to the jack $J_1$. This completes a circuit as follows: From ground in parallel through the windings of polar busy relays $BR_c$ and $BR_c'$, over the back contact of relay $R_3'$, over the tip conductor of the plug $P_1'$, over the sleeve conductor of the jack of the called line to the sleeve conductor of said line. If the line is busy because it is communicating with another line it will have negative battery on its sleeve through the relay corresponding to relay $R_4$ of the connecting cord circuit. This causes current to flow through the polar relay $BR_c$ in such a direction as to operate said relay. The polar relay $BR_c'$ is poled in the opposite direction and does not operate. The busy lamp $BL_c$ is operated and the operator is thus notified that the line is busy.

The same effect will, of course, be produced if the called line is busy due to a busy cord such as the cord BC being plugged into its jack. If, on the other hand, a practice cord such as PC is connected to the called line or an out-of-order cord such as OOC is connected thereto, +48 volt battery will appear on the sleeve of the called line, with the result that the polar relay $BR_c'$ will be operated and the polar relay $BR_c$ will not be operated. This will produce a buzzer signal, indicating to the operator that the line is either out of order or is practicing.

While under certain conditions the operator may be instructed to disregard these signals and plug into the line, these conditions will be taken up later. For the present it will be assumed that the operator finds upon testing that the line is not busy. In such case she will insert the plug $P_1'$ into the jack of the called line corresponding to the jack $J_1$. A circuit will now be completed over the calling sleeve of the cord circuit from —24 volt battery, through the winding of the relay $SR_s'$, over the sleeve of the plug $P_1'$, over the sleeve conductor of the jack of the called line corresponding to the jack $J_1$, and thence through the upper winding of the sleeve relay of the called line corresponding to the relay $SR_1$. Said sleeve relay will thus be actuated.

Upon being operated the relay $SR_s'$ in the sleeve circuit of the cord completes a circuit at its front contact through the right-hand winding of the relay $R_4$. As the latter relay is already energized, however, this circuit produces no SW, through the relay LR and sender SS, over the upper conductor of the line L, over contact 2 of the sleeve relay $SL_r$, and through the upper winding of relay $R_1$ to −48 volt battery. As relay $R_1$ now receives current through only its upper winding it pulls up its armature and again energizes relay $R_1$. Relay $R_1$ at its front contact closes the circuit previously traced for the supervisory lamp $SL_a$ over the front contact of relay $R_3$. In a similar manner the calling subscriber by throwing his switch corresponding to SW will cause the supervisory lamp $SL_c$ to glow. The operator upon seeing the supervisory signal withdraws the plugs from the jacks. This deenergizes the sleeve relay $SR_1$ of the line L and the corresponding sleeve relay of the called line. Relay $SR_1$ at its contacts 2 and 4 opens the circuit for the relay $R_1$ which is restored to normal. The similar relay in the called line is likewise restored to normal by the sleeve relay of that line.

When the plugs are withdrawn the circuits previously established for the relays $PSR_s$ and $SR_s$ at the answering end of the cord circuit and for the relay $SR_s'$ at the calling end of the cord circuit are opened. Relay $PSR_s$ opens the circuit of relay $R_3$ and also the circuit through the lefthand winding of relay $R_4$. Relay $SR_s'$ in turn releases $R_3$ and breaks the circuit for the right hand winding of relay $R_4$. All of the relays in the cord circuits are now restored to normal.

*Practicing*

When the subscriber wishes to practice he calls the operator as before by throwing his switch SW, and when the operator answers, he informs her that he wishes a practice cord. The operator then passes the word by telephone to a trouble operator who inserts plug $P_2$ of a practice cord such as PC, into a multiple jack $J_2$ of the line. In the meanwhile the answering operator withdraws the plug $P_1$.

Upon insertion of the plug of the practice cord PC in the jack $J_2$ a circuit is completed from +48 volt battery in the practice cord through a 500-ohm resistance, through the winding of the relay $SR_p$, over contact 4 of relay $R_6$, over sleeve contacts of the Plug $P_2$ and jack $J_2$, and through the upper winding of the sleeve relay $SR_1$ of the line to ground. Relay $SR_p$ and the sleeve relay $SR_1$ are both energized over this circuit. The former relay closes the circuit of the relay $R_5$ which at its lower contact short-circuits said 500-ohm resistance. When the relay $SR_1$ is operated the line lamp $LL_1$ is extinguished and a practicing circuit is completed as follows: From +48 volt battery, over the upper front contact of relay $R_5$, contact 3 of relay $R_6$, ring conductors of the plug $P_2$ and jack $J_2$, ring conductor of the line, over contact 3 of relay $SR_1$ through the lower winding of relay $R_1$, through the substation apparatus and back over the upper conductor of the line, over the contact 2 of relay $SR_1$, and through the upper winding of relay $R_1$ to −48 volt battery. The subscriber may now print messages on his local printer by operating his sender.

It will be noted that the practicing circuit above traced passes through opposing windings of the relay $R_1$ which consequently releases relay $R_1$. When the subscriber no longer wishes to use the practice circuit he throws the switch SW to its upper position, thereby opening the circuit through the lower winding of the relay $R_1$ and completing a circuit which has been previously traced through the upper winding only of said relay. Relay $R_1$ is actuated and closes the circuit of the relay $R_1$ which in turn closes a circuit from ground over the tip conductors of jack $J_2$ and plug $P_2$, over contact 1 of relay $R_6$ and through the winding of relay $R_7$ to −24 volt battery. Relay $R_7$ causes the supervisory lamp $SL_p$ of the practice cord to glow, calling the trouble operator's attention to the fact the practice cord is no longer desired, whereupon the plug of the cord will be withdrawn from the jack.

If, while the subscriber was still practicing, an operator should test the line to determine whether or not it is busy, by applying the tip of the plug $P_1$ of the cord circuit SC to the sleeve of the jack $J_1$ or the jack $J_1'$, a busy signal would be completes as follows: From ground in parallel through the windings of the busy relays $BR_a$ and $BR_a'$, over the back contact of the relay $SR_s$, back contact of relay $R_3$, over the tip conductor of the plug $P_1$, ring conductor of the jack $J_1$, ring conductors of the jack $J_2$ and the plug $P_2$, contact 4 of the relay $R_6$, and through the winding of relay $SR_p$ to +48 volt battery over the lower contact of relay $R_5$. This, it will be noted, will give a positive battery busy test instead of the normal negative battery busy test and will therefore operate the polar relay $BR_a'$. This operates the buzzer indicating to the operator that the line is not normally busy but is either out of order or practicing.

If in accordance with her instructions the operator should decide to ignore the busy signal and plug into the jack of the line which is practicing, the polar relay PRR in the practice cord would be operated. It will be noted that this polar relay is connected at terminal 30 to the sleeve conductor, which in turn is connected over the back contact 4 of relay $R_6$ and through the 1,000-ohm winding of the relay $SR_p$ and the parallel 1,000-ohm resistance, and thence over the lower front contact of relay $R_5$ to the +48 volt battery. The current flowing over this circuit is not in such direction as to cause operation of the polar relay PRR. When the plug $P_1$ is inserted in the jack $J_1$, however, two additional circuits are connected to the sleeve conductor of the plug $P_2$.

One of these extends from −24 volt battery, through the 200-ohm resistance in the cord circuit SC, through the 432-ohm winding of the relay $SR_s$, through the 80-ohm winding of the relay $PSR_s$, over the sleeve conductors of the plug $P_1$ and the jack $J_1$, and thence over sleeve conductors of jack $J_2$ and plug $P_2$ to terminal 30, to which the polar relay PR is connected. The other path extends from the −24 volt battery in the cord circuit SC, through the 17-ohm winding of the relay $R_4$, through the 31.5 ohm resistance, through the 3.5 ohm winding of the relay $PSR_s$ over the sleeve conductors of the plug $P_1$ and of jack $J_1$ and over the sleeve conductors of the jack $J_2$ and the plug $P_2$ to point 30. The result of the connection of these two circuits to point 30 is to change the potential of that point from positive to negative and operate the relay PRR.

This will be more clear from the simplified diagram in Fig. 2. It will be evident that the point 30 to which the polar relay PRR is connected will be at the same potential as the point 10 to which the sleeve relay $SR_1$ is connected. Considering first the condition before the plug $P_2$ is inserted in the jack J, we now have a circuit from +48 volt battery to ground over the lower front contact of relay $R_5$, thence in parallel through the 1,000 ohm winding of the relay $SR_p$ and the 1,000 ohm resistance in bridge therewith, thence over contact 4 of the relay $R_6$ to points 30 and 10, and finally through the 200-ohm winding of the sleeve relay $SR_1$ to ground. It will be noted that the lower front contact of the relay $R_5$ in effect shorts the 500-ohm resistance normally in series with the +48 volt battery, and establishes a direct connection through the winding of the relay $SR_p$ to the +48 volt battery. Consequently the total resistance in the circuit is approximately 700 ohms, and the drop in voltage to the point 30 is such that a potential of approximately +14 volts will exist at this point.

Let us next consider the situation when the plug $P_1$ is inserted in the jack $J_1$. We now have two paths from −24 battery through the windings of the sleeve relay $SR_1$. One of these paths includes a resistance of 200 ohms in series with the 432-ohm winding of the relay $SR_s$ and in series with the 80-ohm lower winding of the relay $PSR_s$, or a total of 712 ohms between the −24 volt battery and the point 10. The other path includes the 17-ohm winding of the relay $R_4$, the 31.5 resistance, and the 3.5 ohm resistance of the upper winding of the relay $PSR_s$, or a total of 52 ohms resistance between the −24 volt battery and the point 10.

The resistance of these two branches in parallel is approximately 48 ohms. Therefore the drop through this resistance to the point 10 is such as to produce a voltage 7 a little more than −19 volts at point 10. It is evident we have at terminal 30 +14 volts from the circuit through the relay $SR_p$ tending to drive current through the polar relay $PRR$ in one direction. At the same time we have from the circuits just discussed a voltage of approximately −19 volts at point 30 tending to drive current through the relay $PRR$ in the opposite direction. The latter voltage being highest, an effective negative voltage of about 5 volts will drive current through the relay $PRR$ in such a direction as to operate it.

When the relay $PRR$ operates it closes its front contact and operates the relay $R_6$. At its front contact 1 relay $R_6$ completes a circuit for the relay $R_7$, which causes the supervisory lamp $SL_p$ to glow. The trouble operator upon observing this signal will take down the practice cord and give the switching operator full control of the line L. Meanwhile relay $R_6$ at its contact 3 opens the practice circuit previously traced and at its contact 4 disconnects the positive battery connection above described, so that now only a negative battery connection exists to the relay $PRR$. At its contact 2 relay $R_6$ connects an interrupted ground over the tip conductors of the plug $P_2$ and jack $J_2$, thence over the tip conductors of the jack $J_1$ and the plug $P_1$, over the front contact of the relay $R_3$ of cord SC, (which has been operated in the meantime due to the actuation of the sleeve relay $PSR_3$ over the circuit shown in Fig. 2), and thence through the supervisory lamp $SL_a$ to −24 volt battery. The supervisory lamp now flashes (until the trouble operator withdraws the practice cord PC) indicating to the switching operator that the previously established connection was a practice connection and not an out-of-order condition. The switching operator may now communicate with the subscriber over the signaling circuit in the usual manner.

Use of out-of-order cord circuit

When the line is out of order the trouble operator inserts the plug $P_4$ of an out of order cord OOC in a jack such as $J_4$. This completes a sleeve circuit as follows: From −48 volt battery, through the lower winding of the relay $SR_o$, over the upper back contact of relay $R_8$, over the sleeve conductor of the plug $P_4$ and the jack $J_4$, and through the upper winding of the sleeve relay $SR_1$ of the line L to ground. The sleeve relay $SR_1$ is operated over this circuit but without any important effect so far as the line L is concerned. However, the operation of the relay $SR_o$ connects +48 volt battery to the ring conductor. It also connects +48 volt battery through the winding of the relay $R_8$ in series with the upper winding of the relay $SR_o$ to the sleeve conductor, and thence over the circuit previously traced through the upper winding of the sleeve relay $SR_1$.

Relay $R_8$ upon operating disconnects the lower winding of the relay $SR_o$ and the −48 volt battery connection so that +48 volt battery is now connected to the sleeve as above described. With +48 volt battery applied to the sleeve conductor of the line, any switching operator who makes a busy test by applying the tip of a plug such as $P_1$ to the sleeve of a jack such as $J_1$, will obtain a buzzer signal instead of a lamp signal to indicate that the line is not normally busy but is either practicing or out of order. The lower contact of the relay $R_8$ connects ground to the tip conductor of the line, so that if the switching operator should ignore the out-of-order signal received and insert the plug $P_1$ in the jack $J_1$, the supervisory lamp $SL_a$ will be continuously lighted. This indicates an out-of-order condition as distinguished from the practicing condition signalized by a flashing lamp.

Use of test trunk

We come now to the suituation where a maintenance man goes out to the subscriber's station to make maintenance tests and local repairs, if necessary. Upon arriving at the station the maintenance man throws the switch SW to its upper position to call the switching operator. When the operator plugs in the maintenance man uses the teletypesender SS at the station to inform her that he wants a test trunk plugged into the line to connect it to the test board shown at the middle right in Fig. 1. The switching operator now communicates this information to the trouble operator by telephone, and the trouble operator thereupon inserts the plug TP of the test trunk TT into the test jack TJ of the line L. The maintenance man in the meantime throws the switch SW to its lower position and proceeds to make preliminary tests of the subscriber's printer while the test trunk is being set up. These preliminary tests include oiling parts, cleaning and adjusting contacts, adjusting relays, and making general mechanical tests of the printing mechanism.

When the trouble operator inserts the plug TP into the jack TJ a sleeve circuit is completed from −48 volt battery in the test trunk TT, through the lower winding of relay $SR_t$, over the upper back contact of relay $R_9$, through the upper winding of relay $SR_t$, over the sleeve conductors of the plug TP and the jack TJ, and through the upper winding of the sleeve relay $SR_1$ to ground. The operation of the relay $SR_1$ completes a circuit previously described through the upper winding of the relay $R_1$ and through the subscriber's station to ground over the upper blade of the switch SW. Relay $R_1$ responds and operates the relay $R_1$ to put ground on the tip conductor, but this at present is without any effect.

The operation of relay $SR_t$, however, connects +48 volt battery over its upper front contact and through the winding of the relay $R_9$, thence through the upper winding of the relay $SR_t$, over the sleeve conductors of plug TP and the jack TJ to ground through the upper winding of the sleeve relay $SR_1$. Relay $R_9$ at its upper front contact opens the circuit through the lower winding of the relay $SR_t$, thus disconecting the —48 volt battery connection from the sleeve and leaving the relay $SR_t$ locked up over the +48 volt battery connection through the winding of the relay $R_9$ and the upper winding of said relay $SR_t$ to the sleeve, as previously traced. This applies +48 volt battery to the sleeve and renders the line out of order to busy tests in a manner similar to that of the out-of-order cord circuit OOC previously described. At its lower contact relay $R_9$ connects ground to the busy lamp BL at the test-board position, causing said lamp to glow and thereby indicate to the test-board attendant that this particular trunk has been taken for use. The test-board attendant is, however, not required to answer this lamp signal, and in the meantime goes about his other duties.

When the maintenance man has completed his preliminary tests he is ready to have test signals sent from the test trunk TT to the subscriber's printer to see how the printer performs. To obtain these test signals he merely throws the switch SW to its upper position. This completes a circuit from +48 volt battery in the test trunk TT, through the winding of the relay $R_{10}$, over contact 2 of relay $R_{10}$, over the heavy ring conductor of the trunk to the ring contacts of the plug TP and the jack TJ, thence over the heavy conductor of the line, over contact 4 of the sleeve relay $SR_1$, through the lower winding of the relay $R_1$, over the upper blade of the switch SW, through the subscriber's set and back over the upper heavy conductor of the line L, over contact 2 of the sleeve relay $SR_1$, and through the upper winding of the relay $R_1$ to —48 volt battery. Relay $R_1$ now receives current through both its opposing windings and releases its armature.

Relay $R_{10}$ is operated over the circuit just traced and at its contact 1 disconnects said relay $R_{10}$ from the heavy line signaling path above traced, and locks up said relay to ground over the lower contact of relay $R_9$. At its contact 3 relay $R_{10}$ connects the signaling path previously traced to contact 2 of the test-board jack TBJ, and thence over the test conductor TC, and over the marking contact of a relay OTR in the test signal apparatus (shown at the top of the diagram) to ground.

This test signal apparatus consists of a distributor D whose segments are connected, as shown, to the five movable switch elements of a test transmitter ORT. The fingers of this transmitter are arranged to be moved back and forth in various combinations between the marking and spacing contacts of the transmitter, either by means of an endless tape carrying some test sentence such as "The quick brown fox jumps over the lazy dog's back," or by means of cams which are so cut as to produce the same result. Successive code combinations corresponding to the test sentence are thus sent successively by the distributor through the windings of the relay OTR, which in turn relays corresponding marking and spacing signals over the test circuit TC, over contact 2 of the test-board jack TBJ, over contact 3 of relay $R_{10}$, and thence over the heavy conductor circuit previously traced through the subscriber's set and the two windings of the relay $R_1$ to ±48 volt battery. The test signals will now be received on the local printer and the maintenance man can visually check whether or not they have been properly printed.

If these signals are satisfactory the maintenance man is ready to proceed with keyboard transmission tests, that is, tests in which the keyboard of the subscriber's teletypewriter is operated. The resultant signals are checked by the test-board attendant who uses a test printer such as TP for the purpose. This of course calls for the cooperation of the test-board attendant. The maintenance man in order to get the attention of the test-board attendant throws the switch SW to its lower position. This opens the circuit through the lower winding of the relay $R_1$, and the relay $R_1$ is operated through its upper winding by a circuit previously traced to ground over the upper blade of the switch SW.

Relay $R_1$ now pulls up and closes the circuit of the relay $R_1$, which in turn applies ground to the tip conductor of the line, and thence over the tip conductors of jack TJ and plug TP, over conductor 40, over contact 4 of locked-up relay $R_{10}$, over contact 1 of the test-board jack TBJ, and through the winding of the relay $R_{11}$ to —24 volt battery. Relay $R_{11}$ is operated and at its lower contact locks itself up from ground over contact 4 of the relay $R_{10}$, over contact 1 of the test-board jack TBJ, and through the winding of said relay $R_{11}$ to battery. At its upper contact relay $R_{11}$ connects —24 volt battery to the test lamp TL. This lamp glows and notifies the test-board attendant that his services are needed. As soon as he is free he inserts the plug TBP of the test printer TP into the test-board jack TBJ. The tip conductor of the plug opens the locking circuit of the relay $R_{11}$ and extinguishes the test lamp TL.

The test-board operator now actuates the ringing key $RK_t$ to apply ringing current to the line, thereby causing the bell B at the subscriber's station to ring. The maintenance man (who has been waiting meanwhile) is thereby informed that the test-board attendant has come into the circuit and is ready to receive keyboard transmission. The maintenance man thereupon throws the switch SW to its upper position and establishes a signal transmission circuit between the subscriber's station and the test-board as follows: from —48 volt battery, through the upper winding of the relay $R_1$ of the subscriber's line, contact 2 of the sleeve relay $SR_1$, through the subscriber's circuit, over the upper blade of the switch SW, lower conductor of the line L, lower winding of the relay $R_1$, contact 4 of the relay $SR_1$, over the ring conductors of the jack TJ and the plug TP, over contact 3 of the relay $R_{10}$, over the ring contact of the test-board jack TBJ, ring conductor of the test-board plug TBP, and through the test printer set TP to ground. The maintenance man now operates his keyboard and sends signals to the test-board attendant who checks them. Two-way transmission is possible between the test-board attendant and the maintenance man for both have receiving printers and senders. In this manner the performance of the keyboard is checked and, if out of order, corrected.

*Taking down test trunk*

When the test-board attendant and the maintenance man are through with their tests the maintenance man is unable to signal an operator to take down the test trunk. The test-board attendant, however, by operating the key K will energize the relay $R_{12}$, which at its upper front contact closes the circuit for the relay $R_{13}$. Relay 13 at its lower contact completes a locking circuit for itself and for relay 12. This circuit extends from ground over the lower front contact of relay 9, over the lower front contact of relay 13, and thence in parallel through the windings of relays $R_{12}$ and $R_{13}$ to $-24$ volt battery. At their upper front contacts relays $R_{12}$ and $R_{13}$ establish a circuit for the disconnect lamp DL at the trouble operator's position. In the meantime the test-board attendant withdraws the plug TBP and the associated test printer circuit from jack TBJ of the test trunk.

The trouble operator, seeing the disconnect lamp glow, will withdraw the plug TP from the jack TJ. All of the line apparatus is accordingly restored to normal. The breaking of the sleeve circuit of the trunk by the withdrawal of the plug TP opens the locking circuit for relays $SR_t$ and $R_9$, which are released. Relay $R_9$ opens the ground connection over its lower contact, thereby releasing locked-up relay $R_{10}$ and the locked-up relays $R_{12}$ and $R_{13}$. These last two relays open the circuit of the disconnect lamp DL, and the circuit of the busy lamp BL is opened at the lower contact of the relay $R_9$. The relay $R_{11}$ and the test lamp TL were previously restored to normal so that now all of the apparatus is in its usual condition.

*Busy conditions produced by test trunk*

During the time that the test trunk TT was connected to the line L by the plug TP being inserted in the jack TJ, it will be recalled that $+48$ volt battery was connected to the sleeve conductor of the line over the front contact of the relay $SR_t$ and through windings of relay $R_9$ and $SR_t$ in series. This puts the same potential upon the sleeve of the line as that produced by an out-of-order cord or a practice cord, as already described. If a switching operator should test the line by applying the tip of her plug $P_1$ to the sleeve of the line lock $J_1$, she would get a buzzer signal instead of a lamp busy signal, indicating that the line is out of order.

If the operator should disregard a busy signal and plug into a line testing "out-of-order," she can determine whether it is really out of order or merely practicing. She would discover that it was practicing, if such was the case, by reason of the fact that the practice cord causes a flashing of the supervisory lamp $SL_a$, as previously described. An out-of-order cord, on the other hand, gives a steady glow of the supervisory lamp. Also in the case of an out-of-order cord the switching operator will be unable to obtain any signals upon her printer from the line because there will be no printer signals transmitted under such conditions.

In case she gets an out-of-order signal due to a test trunk such as TT being connected to the line, she will obtain, in case she plugs in, a steady glow of the supervisory lamp $SL_a$, just as in the case of an out-of-order cord. However, except for the period during which the maintennace man is making preliminary tests and adjustments, signals will be transmitted either from the test-board to the subscriber's station, or from the subscriber's station to the test-board during the time that the test trunk is connected to the line. Therefore, if the operator monitors on the line for a brief interval she will receive these test signals, and from their nature will realize that the line is being used for maintenance tests. She can then use her judgment as to whether such tests should be interrupted to complete a desired connection. She will, of course, have to telephone the trouble operator to take down the test trunk connection as she has no control over it. The trouble operator is able to distinguish between a test trunk and an out-of-order cord by observation, and can verify, if desired, the switching operator's ideas as to which kind of connection is producing the out-of-order signal.

It will be observed that by using the test trunk herein disclosed, the test-board attendant need not take any part in sending standard signals from the test-board to the subscriber's printer for testing purposes. This is all under the automatic control of the maintenance man at the subscriber's premises. It will also be observed that where the arrangements of the present invention are employed there is no necessity for the maintenance man to call the test-board attendant by telephone when he wants his services. The test trunk herein disclosed is provided with adequate signaling facilities by which the necessary communication can be carried on over the test trunk itself.

While this invention has been disclosed in certain specific arrangements which are deemed desirable, it will be obvious that the general principles herein illustrated may be embodied in many other organizations widely different from those illustrated, without departing from the spirit of the invention as defined in the appended claims.

What is claimed is:

1. In a teletypewriter system, a plurality of subscribers' lines having telegraph printing and sending equipment associated therewith at the subscribers' stations, means at a central office to switch any one of said lines into communication with any other of said lines, a testing trunk to associate any of said lines with a test board position, means whereby said trunk may be associated with a given line without calling the test board attendant, and means whereby a source of test signals may be associated with said trunk and transmitted to the subscriber's station under the control of the subscriber's station.

2. In a teletypewriter system, a plurality of subscribers' lines having telegraph printing and sending equipment associated therewith at the subscribers' stations, means at a central office to switch any one of said lines into communication with any other of said lines, a testing trunk to associate any of said lines with a test board position, means whereby said trunk may be associated with a given line without calling the test board attendant, means whereby a source of test signals may be associated with said trunk and transmitted to the subscriber's station under the control of the subscriber's station, and means where the subscriber's station may notify the test board attendant over said trunk to monitor signals sent from the subscriber's station.

3. In a teletypewriter system, a plurality of subscribers' lines having telegraph printing and sending equipment associated therewith at the subscribers' stations, means at a central office to switch any one of said lines into communication with any other of said lines, a testing trunk to associate any of said lines with a test board position, means whereby said trunk may be associated with a given line without calling the test board attendant, means to indicate to the test board attendant that the trunk is in use, means whereby a source of test signals may be associated with said trunk and transmitted to the subscriber's station under the control of the subscriber's station, and means whereby the subscriber's station may notify the test board attendant over said trunk to monitor signals sent from the subscriber's station.

4. In a teletypewriter system, a plurality of subscribers' lines having telegraph printing and sending equipment associated therewith at the subscribers' stations, means at a central office to switch any one of said lines into communication with any other of said lines, a testing trunk to associate any of said lines with a test board position, means whereby said trunk may be associated with a given line without calling the test board attendant, means to indicate to the test board attendant that the trunk is in use, means whereby a source of test signals may be associated with said trunk and transmitted to the subscriber's station under the control of the subscriber's station, means whereby the subscriber's station may notify the test board attendant over said trunk to monitor signals sent from the subscriber's station, and means to signal an operator at the central station to disconnect the trunk from the line.

5. In a teletypewriter system, a plurality of subscribers' lines having telegraph printing and sending equipment associated therewith at the subscribers' stations, a cord circuit at a central office to switch any of said lines into communication with any other of said lines, means to condition a line so connected to give a "busy" indication, means to condition a line to give an "out-of-order" indication, means whereby said cord will distinguish between a "busy" and an "out-of-order" indication, a testing trunk to associate any of said lines with a test board position, means whereby said trunk may be associated with a given line without calling the test board attendant, means associated with said trunk to condition any line to which it is connected to give an "out-of-order" indication, and means whereby a source of test signals may be associated with said trunk and transmitted to the subscriber's station under the control of the subscriber's station.

6. In a teletypewriter system, a plurality of subscribers' lines having telegraph printing and sending equipment associated therewith at the subscriber's stations, a cord circuit at a central office to switch any of said lines into communication with any other of said lines, means to condition a line so connected to give a "busy" indication, means to condition a line to give an "out-of-order" indication, means whereby said cord will distinguish between a "busy" and an "out-of-order" indication, a testing trunk to associate any of said lines with a test board position, means whereby said trunk may be associated with a given line without calling the test board attendant, means associated with said trunk to condition any line to which it is connected to give an "out-of-order" indication, means whereby a source of test signals may be associated with said trunk and transmitted to the subscriber's station under the control of the subscriber's station, and means whereby the subscriber's station may notify the test board attendant over said trunk to monitor signals sent from the subscriber's station.

7. In a teletypewriter system, a plurality of subscribers' lines having telegraph printing and sending equipment associated therewith at the subscribers' stations, a cord circuit at a central office to switch any of said lines into communication with any other of said lines, means to condition a line so connected to give a "busy" indication, means to condition a line to give an "out-of-order" indication, means whereby said cord will distinguish between a "busy" and an "out-or-order" indication, a testing trunk to associate any of said lines with a test board position, means whereby said trunk may be associated with a given line without calling the test board attendant, means associated with said trunk to condition any line to which it is connected to give an "out-of-order" indication, means to indicate to the test board attendant that the trunk is in use, means whereby a source of test signals may be associated with said trunk and transmitted to the subscriber's station under the control of the subscriber's station, and means whereby the subscriber's station may notify the test board attendant over said trunk to monitor signals sent from the subscriber's station.

8. In a teletypewriter system, a plurality of subscribers' lines having telegraph printing and sending equipment associated therewith at the subscribers' stations, a cord circuit at a central office to switch any of said lines into communication with any other of said lines, means to condition a line so connected to give a "busy" indication, means to condition a line to give an "out-of-order" indication, means whereby said cord will distinguish between a "busy" and an "out-of-order" indication, a testing trunk to associate any of said lines with a test board position, means whereby said trunk may be associated with a given line without calling the test board attendant, means associated with said trunk to condition any line to which it is connected to give an "out-of-order" indication, means to indicate to the test board attendant that the trunk is in use, means whereby a source of test signals may be associated with said trunk and transmitted to the subscriber's station under the control of the subscriber's station, means whereby the subscriber's station may notify the test board attendant over said trunk to monitor signals sent from the subscriber's station, and means to signal an operator at the central station to disconnect the trunk from the line.

9. In a teletypewriter system, a plurality of subscribers' lines having telegraph printing and sending equipment associated therewith at the subscribers' stations, a cord circuit at a central office to switch any of said lines into communication with any other of said lines, means to condition a line so connected to give a "busy" indication, means to condition a line to give an "out-of-order" indication, means whereby said cord will distinguish between a "busy" and an "out-of-order" indication, a testing trunk to associate any of said lines with a test board position, means whereby said trunk may be associated with a given line without calling the test board attendant, means associated with said trunk to condition any line to which it is connected to give an "out-of-order" indication, a practice cord adapted to be connected to a line to enable the subscriber's sender and printer to be used for practicing, said practice cord conditioning the line to give an "out-of-order" indication, means to enable a switching operator who disregards the "out-of-order" signal and plugs into the line to determine whether a practicing cord or a test trunk is associated with the line, and means whereby a source of test signals may be associated with said trunk and transmitted to the subscriber's station under the control of the subscriber's station.

10. In a teletypewriter system, a plurality of subscribers' lines having telegraph printing and sending equipment associated therewith at the subscribers' stations, a cord circuit at a central office to switch any of said lines into communication with any other of said lines, means to condition a line so connected to give a "busy" indication, means to condition a line to give an "out-of-order" indication, means whereby said cord will distinguish between a "busy" and an "out-of-order" indication, a testing trunk to associate any of said lines with a test board position, means whereby said trunk may be associated with a given line without calling the test board attendant, means associated with said trunk to condition any line to which it is connected to give an out-of-order" indication, a practice cord adapted to be connected to a line to enable the subscriber's sender and printer to be used for practicing, said practice cord conditioning the line to give an "out-of-order" indication, means to enable a switching operator who disregards the "out-of-order" signal and plugs into the line to determine whether a practicing cord or a test trunk is associated with the line, means whereby a source of test signals may be associated with said trunk and transmitted to the subscriber's station under the control of the subscriber's station, and means whereby the subscriber's station may notify the test board attendant over said trunk to monitor signals sent from the subscriber's station.

11. In a teletypewriter system, a plurality of subscribers' lines having telegraph printing and sending equipment associated therewith at the subscribers' stations, a cord circuit at a central office to switch any of said lines into communication with any other of said lines, means to condition a line so connected to give a "busy" indication, means to condition a line to give an "out-of-order" indication, means whereby said cord will distinguish between a "busy" and an "out-of-order" indication, a testing trunk to associate any of said lines with a test board position, means whereby said trunk may be associated with a given line without calling the test board attendant, means associated with said trunk to condition any line to which it is connected to give an "out-of-order" indication, a practice cord adapted to be connected to a line to enable the subscriber's sender and printer to be used for practicing, said practice cord conditioning the line to give an "out-of-order" indication, means to enable a switching operator who disregards the "out-of-order" signal and plugs into the line to determine whether a practicing cord or a test trunk is associated with the line, means to indicate to the test board attendant that the trunk is in use, means whereby a source of test signals may be associated with said trunk and transmitted to the subscriber's station under the control of the subscriber's station, and means whereby the subscriber's station may notify the test board attendant over said trunk to monitor signals sent from the subscriber's station.

12. In a teletypewriter system, a plurality of subscribers' lines having telegraph printing and sending equipment associated therewith at the subscribers' stations, a cord circuit at a central office to switch any of said lines into communication with any other of said lines, means to condition a line so connected to give a "busy" indication, means to condition a line to give an "out-of-order" indication, means whereby said cord will distinguish between a "busy" and an "out-of-order" indication, a testing trunk to associate any of said lines with a test board position, means whereby said trunk may be associated with a given line without calling the test board attendant, means associated with said trunk to condition any line to which it is connected to give an "out-of-order" indication, a practice cord adapted to be connected to a line to enable the subscriber's sender and printer to bs used for practicing, said practice cord conditioning the line to give an "out-of-order" indication, means to enable a switching operator who disregards the "out-of-order" signal and plugs into the line to determine whether a practicing cord or a test trunk is associated with the line, means to indicate to the test board attendant that the trunk is in use, means whereby a source of test signals may be associated with said trunk and transmitted to the subscriber's station under the control of the subscriber's station, means whereby the subscriber's station may notify the test board attendant over said trunk to monitor signals sent from the subscriber's station, and means to signal an operator at the central station to disconnect the trunk from the line.

JAMES SPENCER SODERHOLM.
CHARLES BREEN.